United States Patent [19]

Ogiso

[11] Patent Number: 5,238,261
[45] Date of Patent: Aug. 24, 1993

[54] SUSPENSION OF STEERING VEHICLE WHEEL HAVING Z-TYPE UPPER ARM ASSEMBLY

[75] Inventor: Satoshi Ogiso, Toyota, Japan

[73] Assignee: Toyota Jidosha Kabushiki Kaisha, Toyota, Japan

[21] Appl. No.: 834,594

[22] Filed: Feb. 12, 1992

[30] Foreign Application Priority Data

Mar. 8, 1991 [JP] Japan .................................. 3-68760

[51] Int. Cl.⁵ .............................................. B60G 3/20
[52] U.S. Cl. ..................................... 280/667; 280/675;
                                            280/691; 280/696
[58] Field of Search ............... 280/675, 673, 691, 692,
                                    280/696, 667, 701, 690

[56] References Cited

U.S. PATENT DOCUMENTS

| 4,372,418 | 2/1983 | Dangel | 280/667 X |
| 4,871,187 | 10/1989 | Schaible | 280/696 X |
| 4,875,703 | 10/1989 | Murakami | 280/696 X |
| 4,883,287 | 11/1989 | Murakami et al. | 280/696 X |
| 5,048,860 | 9/1991 | Kanai et al. | 280/691 |

FOREIGN PATENT DOCUMENTS

| 391110 | 8/1990 | Austria . | |
| 0351376 | 1/1990 | European Pat. Off. . | |
| 0355362 | 2/1990 | European Pat. Off. . | |
| 3924828 | 2/1990 | Fed. Rep. of Germany . | |
| 59-154410 | 10/1984 | Japan . | |
| 67204 | 4/1985 | Japan | 280/690 |
| 3-193513 | 8/1991 | Japan | 280/675 |

Primary Examiner—David M. Mitchell
Assistant Examiner—Gary C. Hoge
Attorney, Agent, or Firm—Oliff & Berridge

[57] ABSTRACT

An upper arm in the conventional double wishbone type suspension of a steering vehicle wheel is replaced by a Z-type upper arm assembly including a first arm member extending substantially transversely in the vehicle, a link member extending substantially vertically in the vehicle and a second arm member extending substantially transversely in the vehicle, whereby a more space is allowed for an engine or a transmission at the inboard side of the upper arm assembly as compared with the conventional double wishbone type suspension with availability of a desirable performance in respect of the relation between the relative camber angle and the bounding and rebounding wheel stroke so a to improve a turn running performance of the vehicle.

7 Claims, 5 Drawing Sheets

SUSPENSION OF STEERING VEHICLE WHEEL HAVING Z-TYPE UPPER ARM ASSEMBLY

BACKGROUND OF THE INVENTION

1. Field of the Invention

The present invention relates to a suspension of a steering vehicle wheel in a vehicle such as an automobile, and more particularly, to an improvement of a double wishbone type suspension of a steering vehicle wheel in the requirement of a mounting space therefor and further in a camber variation performance according to bounding and rebounding of the steering vehicle wheel.

2. Description of the Prior Art

A steering vehicle wheel in a vehicle such as an automobile is generally supported by a knuckle which in turn is supported by a suspension link mechanism via a king pin to be able to turn about the axis of the king pin. The suspension link mechanism is known in various constructions one of which is known as the double wishbone type link mechanism which generally comprises upper and lower arms extending substantially in parallel with one another and transversely in the vehicle from their inner ends pivotably connected with a body of the vehicle to their outer ends pivotably connected with an upper portion and a lower portion of the knuckle, respectively, so as to form a parallelogrammic link mechanism composed of the upper and lower arms, the vehicle body and the knuckle, thus the knuckle being shiftable up and down relative to the vehicle body in the bounding and rebounding of the vehicle wheel, generally under a downward biasing force applied by a suspension spring mounted between the parallelogrammic link mechanism and the vehicle body.

A typical construction of such a double wishbone type suspension is shown in FIG. 1 in a diagrammatical illustration as a front or a rear view looked in the longitudinal direction of the vehicle. In this figure, 100 is a steering vehicle wheel bearing a tire 102 and supported to be rotatable about a central axis thereof by a knuckle 104 which in turn is supported by a body 106 of a vehicle via an upper arm 108 and a lower arm 110. The upper arm 108 extends substantially transversely in the vehicle from its inner end pivotably connected with the vehicle body 106 via a pivot joint 112 to its outer end pivotably connected with an upper portion of the knuckle 104 via a pivot joint 114. The lower arm 110 also extends substantially transversely in the vehicle from its inner end pivotably connected with the vehicle body 106 via a pivot joint 116 to its outer end pivotably connected with a lower portion of the knuckle 104 via a pivot joint 118. As is well known in the art, the upper and lower arms 108 and 110 are generally constructed as an A-type or an H-type link or in a similar construction having a substantial width so that the pivot joints 112 and 116 for the inner ends of these transverse arms are each provided as a pair of joints spaced in the longitudinal direction of the vehicle, thereby providing a rigidity to said parallelogrammic link mechanism against a turning relative to the vehicle body in the longitudinal directions of the vehicle, while said parallelogrammic link mechanism is readily deformable in a vertical phantom plane so that the knuckle 104 is shiftable up and down relative to the vehicle body 106 with maintenance of parallelism. A phantom straight line 120 which connects pivoting centers of the pivot joints 114 and 118 provides the well known king pin axis.

Such a double wishbone type suspension requires a relatively large mounting space, particularly when the upper and lower arms 108 and 110 are made long enough to provide a good linearity in the up and down or bounding and rebounding movement of the vehicle wheel relative to the vehicle body. Particularly, the space required for the upper arm 108 often interferes with the space required for an engine or a transmission. Therefore, it is desired from the view point of mounting space that the arms, particularly the upper arm is made much shorter than desirable from the view point of ensuring the linearity in the movement of the vehicle wheel.

On the other hand, in a substantially parallelogrammic double wishbone link mechanism such as shown in FIG. 1, a camber angle of the vehicle wheel which the vehicle wheel expands relative to the vehicle body and which is referred to as "relative camber angle" hereinbelow, in contrast to the so called camber angle defined as an angle which the vehicle wheel expands relative to a straight line perpendicular to a road surface, does not change according to the up and down movement of the vehicle wheel relative to the vehicle body, i.e. the bounding and rebounding of the vehicle wheel. Such a performance of the relative camber angle is shown in a diagram in FIG. 4, in which the ordinate represents the up and down movement of the vehicle wheel relative to the vehicle body, i.e. the bounding and rebounding, while the abscissa represents the above-mentioned relative camber angle. The vertical solid line A coinciding with the ordinate axis represents the performance in respect of the relative camber angle of the suspension link mechanism shown in FIG. 1.

For an improvement of a turn running performance of the vehicle it is considered to be desirable that the relative camber angle decreases (becomes negative, i.e. top of vehicle wheel moves inboard) along with the bounding of the vehicle wheel, while it increases (become positive, i.e. top of vehicle wheel moves outboard) along with the rebounding of the vehicle wheel, so that the cambering of the vehicle wheel to the outside of a turning due to the rolling of the vehicle body to the outside of the turning is thereby cancelled.

In order to obtain such a cambering performance it is considered to incline the upper arm 108 in the double wishbone type suspension as shown in FIG. 2, so that its outer end connected with the knuckle by the pivot joint 114 is higher than its inner end connected with the vehicle body by the pivot joint 112, as compared with the lower arm 110. By so inclining the upper arm 108 relative to the lower arm 110, the above-mentioned relative camber angle changes to be more negative along with more bounding of the vehicle wheel and to be more positive along with more rebounding of the vehicle wheel, as shown by a dot-dash line B in FIG. 4. It is considered to be desirable for such a purpose of improving the turn running performance of the vehicle that the relative camber angle changes generally inversely symmetrically at a certain moderate rate according to the bounding and rebounding of the vehicle wheel so that the performance line of the relative camber angle versus bounding and rebounding wheel stroke expressed in a graph such as shown in FIG. 4 is a relatively straight line having a moderate inclination angle relative to the ordinate axis, like the above-mentioned line B. Such a performance line will become more straight as the upper and lower arms in the double wishbone type suspension are made longer.

However, the arm length, particularly that of the upper arm in the double wishbone type suspension is often restricted by an engine or a transmission, as diagrammatically shown in FIG. 3 by a shadowed obstacle. When the upper arm 108 is made shorter as shown in FIG. 3, the performance line of the relative camber angle versus bounding and rebounding wheel stroke is deformed as shown by a two dot-dash line C in FIG. 4, so that the relative camber angle increases at a too high rate in the negative direction along with increase of the bounding of the vehicle wheel, whereas the relative camber angle does not increase sufficiently in the positive direction along with increase of the rebounding of the vehicle wheel, saturating too early and turning into a decreasing performance along with further increase of the rebounding of the vehicle wheel, as is apparent from FIG. 4.

SUMMARY OF THE INVENTION

In view of the above-mentioned circumstances concerned with the double wishbone type suspension and also in improving the turn running performance of the vehicle by a variation control of the relative camber angle, it is a first object of the present invention to provide a new type of fundamentally double wishbone type suspension of a steering vehicle wheel, and it is also a second object of the present invention to provide a modification of said new type double wishbone type suspension in which a desirable performance in respect of the relative camber angle such as expressed by the above-mentioned line B in FIG. 4 is available so that the turn running performance of the vehicle is improved from the view point of variation of the relative camber angle of the vehicle wheel.

According to the present invention, the above-mentioned first object is accomplished by a suspension of a steering vehicle wheel in a vehicle, comprising a knuckle for supporting the steering vehicle wheel to be rotatable about a central axis thereof, a lower arm means extending substantially transversely in the vehicle from an inner end thereof pivotably connected with a body of the vehicle to an outer end thereof pivotably connected with a lower portion of said knuckle, an upper arm assembly pivotably supporting an upper portion of said knuckle relative to the body of the vehicle substantially in parallel with said lower arm means, and a biasing means biasing a combination of said knuckle, said lower arm means and said upper arm assembly downward relative to the body of the vehicle, wherein said upper arm assembly comprises a first arm member extending substantially transversely in the vehicle from an inner end thereof pivotably connected with the body of the vehicle to an outer end thereof, a link member extending substantially vertically in the vehicle from a lower end thereof pivotably connected with said outer end of said first arm member to an upper end thereof, and a second arm member extending substantially transversely in the vehicle from an inner end thereof pivotably connected with said upper end of said link member to an outer end thereof pivotably connected with the body of the vehicle, said upper portion of said knuckle being pivotably connected with a middle portion of said link member.

Further, according to the present invention, the above-mentioned first and second objects are both accomplished by a suspension having the above-mentioned basic construction, wherein said first arm member is inclined upward toward outboard of the vehicle relative to said lower arm means, while said second arm member is substantially parallel with said lower arm means, or said first arm member is substantially parallel with said lower arm means, while said second arm member is inclined upward toward outboard of the vehicle relative to said lower arm means.

According to the present invention, said first arm member may be substantially shorter than said lower arm means.

BRIEF DESCRIPTION OF THE DRAWING

In the accompanying drawings.

DESCRIPTION OF THE PREFERRED EMBODIMENTS

Figure 1:
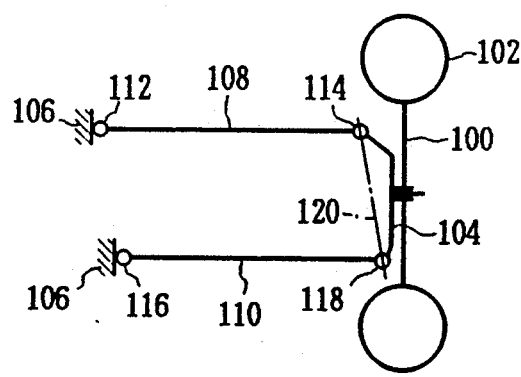
FIG. 1 is a diagrammatical illustration of the conventional double wishbone type suspension of a steering vehicle wheel.
Figure 2:
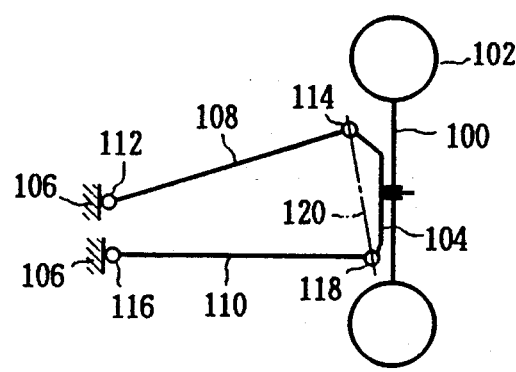
FIG. 2 is a view similar to FIG. 1, showing a modification of the suspension shown in FIG. 1 for an improvement of a turn running performance of the vehicle.
Figure 3:
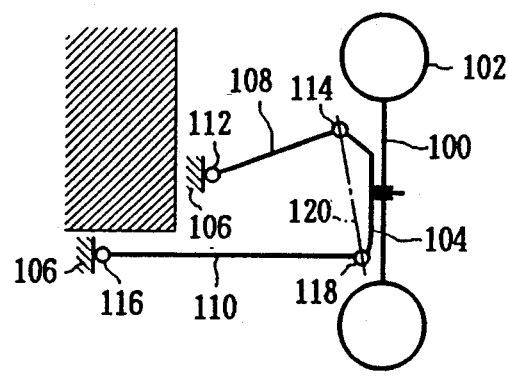
FIG. 3 is a view similar to FIG. 2, showing a further modification of the suspension shown in FIG. 2, compelled by a requirement of mounting space for an engine or a transmission.
Figure 5:
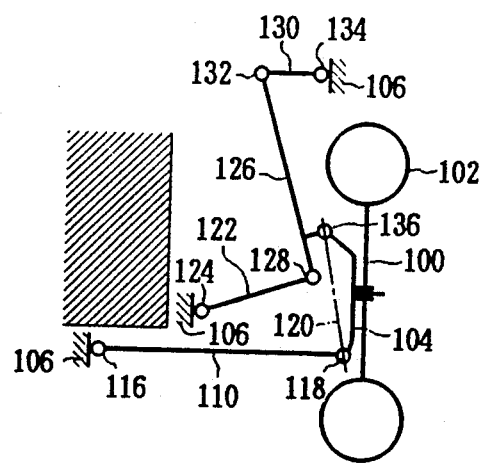
FIG. 5 is a diagrammatical illustration similar to FIGS. 1-3, illustrating an embodiment of the suspension according to the present invention.

Referring to FIG. 5 showing an embodiment of the present invention in a diagrammatical manner similar to FIGS. 1-3, wherein the portions corresponding to those shown in FIGS. 1-3 are designated by the same reference numerals for the convenience of comparison, the upper arm 108 in the conventional double wishbone type suspension is replaced by a combination of a first arm member 122 extending substantially transversely in the vehicle from its inner end pivotably connected with the vehicle body 106 via a pivot joint 124 to its outer end, a link member 126 extending substantially vertically in the vehicle from its lower end pivotably connected with the outer end of the first arm member 122 via a pivot joint 128, and a second arm member 130 extending substantially transversely in the vehicle from its inner end pivotably connected with the upper end of the link member 126 via a pivot joint 132 to its outer end pivotably connected with the vehicle body 106 via a pivot joint 134, thus forming a Z-type upper arm assembly, so that the knuckle 104 is pivotably connected at an upper portion thereof with a middle portion of the link member 126 via a pivot joint 136.

Figure 6:
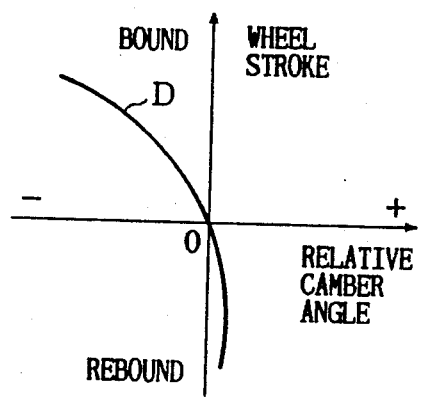
FIG. 6 is a graph showing the performance of the first arm member in respect of the relative camber angle versus the bounding and rebounding wheel stroke in the construction shown in FIG. 5.

In the embodiment shown in FIG. 5, particularly for the purpose of comparison with the construction shown in FIG. 3 in respect of the performance of variation of the relative camber angle according to the bounding and rebounding of the vehicle wheel, the first arm member 122 is arranged as inclined in the same manner as the upper arm 108 in the construction shown in FIG. 3, so that the outer end of the first arm member 122 connected with the lower end of the link 126 via the pivot joint 128 is positioned to be higher than the inner end of the first arm member 122 connected with the vehicle body via the pivot joint 124, relative to the lower arm 110. The outer end of the first arm member 122, or the pivot joint 128, has a similar performance as the shorter upper arm 108 in the construction shown in FIG. 3 in respect of the relation between the relative camber angle and the bounding and rebounding wheel stroke, as shown in the graph of FIG. 6. The performance curve D of FIG. 6 is similar to the performance curve C in FIG. 4.

When the vehicle wheel bounds and rebounds in the construction shown in FIG. 5, the second arm member 130 turns up and down around the pivot joint 134. Since the second arm member 130 extends substantially parallel with the lower arm 110, according to the bounding and rebounding of the vehicle wheel from its neutral position, the performance of the inner end of the second arm member 130, or the pivot joint 132, in respect of the relation between the relative camber angle and the bounding and rebounding wheel stroke is symmetrical with respect to the bounding and rebounding of the vehicle wheel, as shown by a line E in FIG. 7 which is a graph by the same coordinates as the graphs shown in FIGS. 4 and 6. As the connection point between the link member 126 and the knuckle 104, or the pivot joint 136, is positioned so much closer to the lower end of the link member 126 than to the upper end thereof as illustrated in FIG. 5, the performance in respect of the relation between the relative camber angle and the bounding and rebounding wheel stroke of the second arm member 130 is, when viewed at the connection point of the link member 126 and the knuckle 104, or the pivot joint 136, is modified as shown by a performance curve F in FIG. 7.

Figure 7:
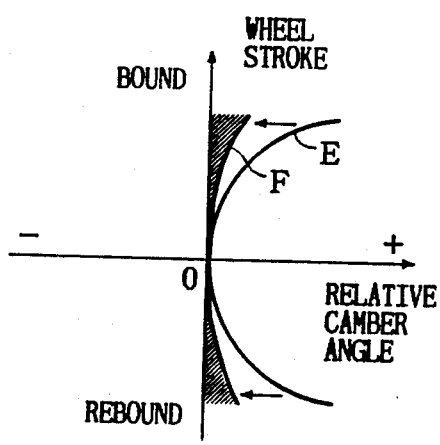
FIG. 7 is a graph showing the performances of the second arm member and a combination of the second arm member and the link member in respect of the relative camber angle versus the bounding and rebounding wheel stroke in the construction shown in FIG. 5.
Figure 8:
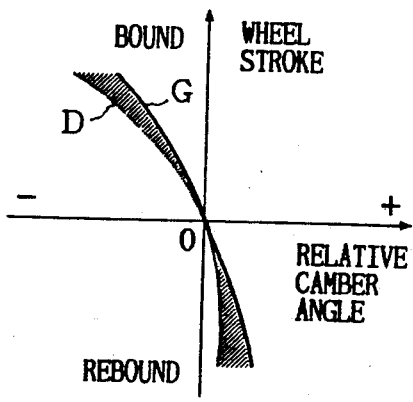
FIG. 8 is a graph showing the overall performance in respect of the relative camber angle versus the bounding and rebounding wheel stroke available by the construction shown in FIG. 5.

Therefore, in the overall operation of the suspension link mechanism shown in FIG. 5, the performance in respect of the relative camber angle versus the bounding and rebounding wheel stroke of the knuckle 104, or the vehicle wheel, is such that is based upon the performance due to the first arm member 122 and is modified by the performance due to the second arm member 130, so that the performance curve D in FIG. 6 is deformed as much as the shadow area as shown in FIG. 8, so as to provide a performance curve G, wherein the shadow area in FIG. 8 corresponds to the shadow area in FIG. 7. The performance curve G is similar to the performance B in FIG. 4, representing a desirable performance of the suspension of a steering vehicle wheel from the view point of variation of the relative camber angle along with the bounding and rebounding of the vehicle wheel.

Figure 4:
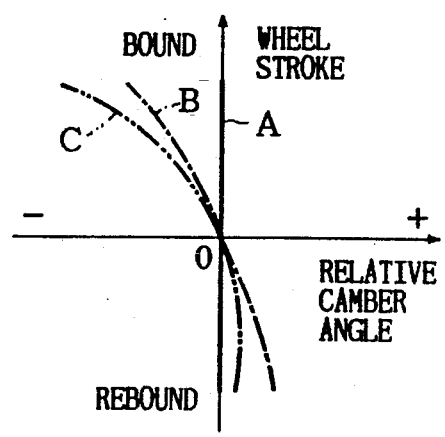
FIG. 4 is a graph showing several performances with respect to the relation between the relative camber angle and the bounding and rebounding wheel stroke.
Figure 9:
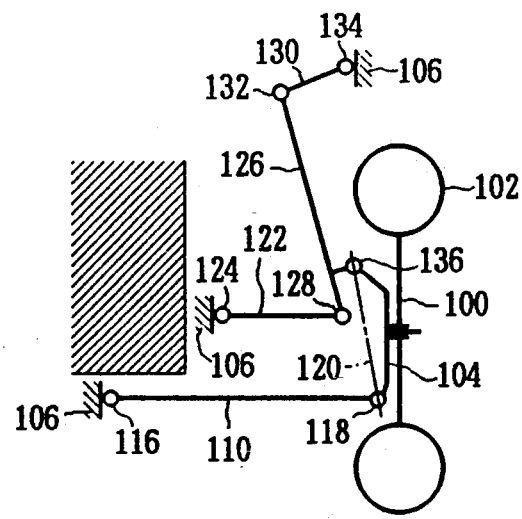
FIG. 9 is a diagrammatical view similar to FIG. 5, showing another embodiment of the present invention.

Although the embodiment shown in FIG. 5 has the first arm member 122 inclined in a similar manner as the upper arm 108 in the construction shown in FIG. 3 for the convenience of appreciation of the function of the present invention from the view point of the problem described with reference to FIGS. 3 and 4, the same effect of accomplishing a performance line such as expressed by a relatively straight line having a moderate inclination relative to the ordinate axis in the graph of the relative camber angle verses the bounding and rebounding wheel stroke as the graph of FIG. 4 or 9 is also available by a construction shown in FIG. 9 which shows another embodiment of the present invention in the same manner as FIG. 5. In the construction shown in FIG. 9, the first arm member 122 extends substantially in parallel with the lower arm 110, while the second arm member 130 is inclined so that its outer end, or the pivot joint 134, is positioned to be higher than its inner end, or the pivot joint 132, it will be appreciated that the construction shown in FIG. 9 also provides the above-mentioned desirable performance in respect of the relative camber angle versus the bounding and rebounding wheel stroke with the same less requirement of mounting space.

Figure 10:
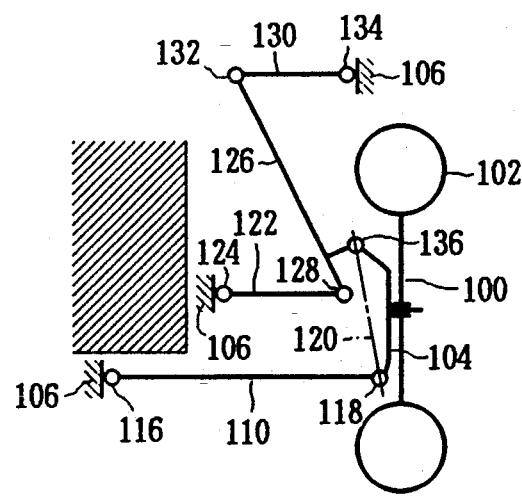
FIG. 10 is a diagrammatical view similar to FIG. 5 or FIG. 9, showing still another embodiment of the present invention.

The combination of the first arm member 122, the link member 126 and the second arm member 130 according to the present invention may be used as a general substitution for the upper arm 108 in the conventional double wishbone type suspension, so as to allow for the shortened upper arm and to provide more space for an engine or a transmission, as shown in FIG. 10, which shows still another embodiment of the present invention, in the similar diagrammatical manner as FIGS. 5 and 9. In this construction in which the first arm member 122 and the second arm member 130 are arranged to be substantially parallel with one another, the connection point between the link member 126 and the knuckle 104, or the pivot joint 136, moves substantially vertically along with the bounding and rebounding of the vehicle wheel, so that a performance substantially the same as that of the conventional double wishbone type suspension shown in FIG. 1 is available in respect of the relation between the relative camber angle and the bounding and rebounding wheel stroke.

Figure 11:
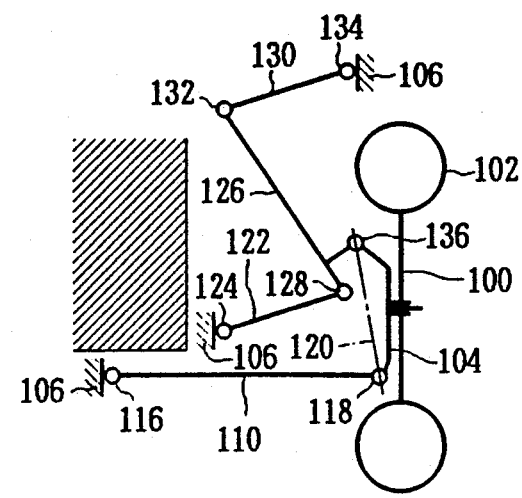
FIG. 11 is a diagrammatical view similar to FIG. 5, 9 or 10, showing still another embodiment of the present invention.

FIG. 11 shows still another embodiment of the present invention in the similar diagrammatical manner as FIG. 10, wherein the first arm member 122 and the second arm member 130 are also arranged substantially parallel with one another, while the two arm members are both inclined with substantially the same inclination relative to the lower arm 110. The construction of FIG. 11 operates substantially in the same manner as the construction of FIG. 10.

Figure 12:
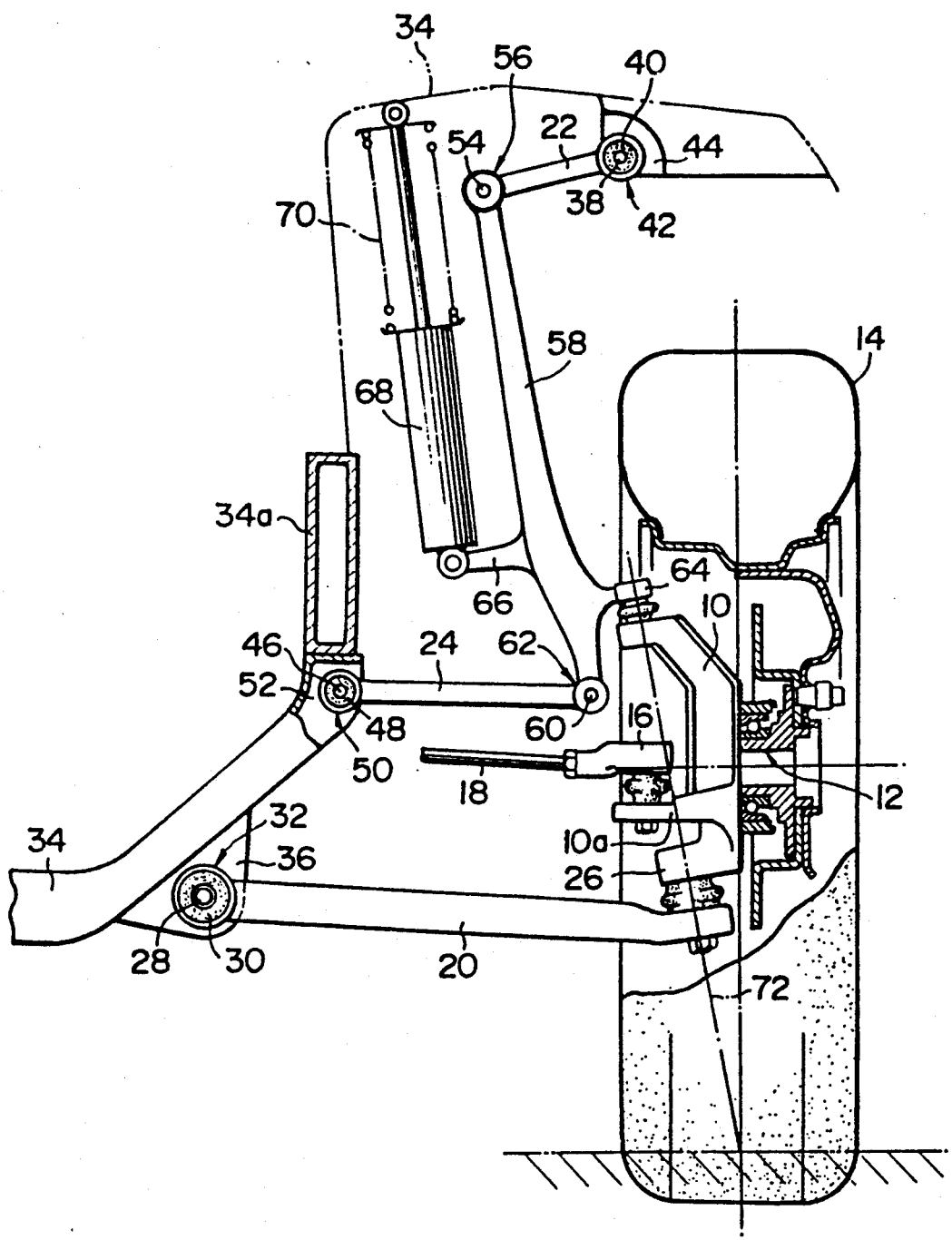
FIG. 12 is a view similar to FIG. 9, showing the construction of the suspension according in a more practical manner.
Figure 13:
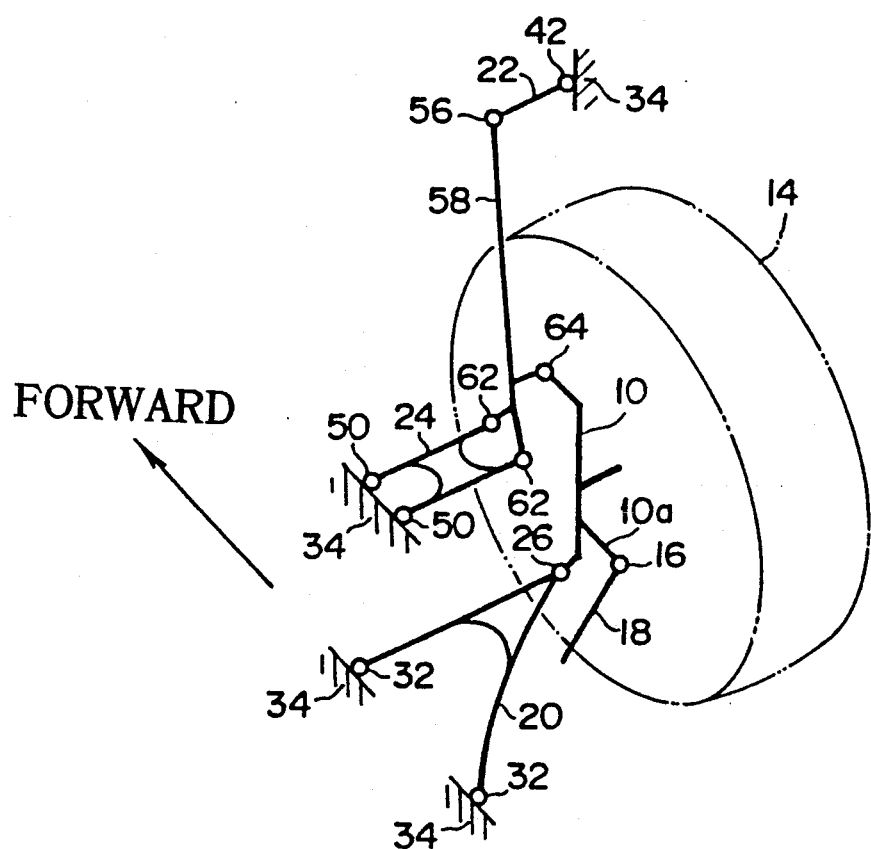
FIG. 13 is a perspective view in a diagrammatical illustration of the suspension shown in FIG. 12.

FIG. 12 is an illustration of a more practical embodiment of the present invention. The link construction of this embodiment corresponds to the diagrammatical illustration of FIG. 9. FIG. 13 is a diagrammatical perspective view of the suspension construction shown in FIG. 12.

In these figures, a member designated by 10 is a knuckle corresponding to the knuckle 104 in the construction shown in FIG. 9. The knuckle 10 supports a vehicle wheel 14 by a bearing means 12. The knuckle 10 has a knuckle arm 10a pivotably connected with a tie rod 18 by a ball joint 16. An arm member 20 corresponds to the lower arm 110 in FIG. 9. As is more clear in FIG. 13, the lower arm 20 is formed as an A-type arm in this embodiment. The two inner ends of the A-type lower arm 20 are pivotably connected with a body 34 of the vehicle, particularly bracket portions 36 thereof, by two pivot joints 32 each including a shaft member 28 and an annular rubber bush 30 and corresponding to the pivot joint 116 in FIG. 9. An outer end of the lower arm 20 is pivotably connected with a lower end portion of the knuckle 10 by a pivot joint 26 corresponding to the pivot joint 118 in FIG. 9.

An arm member 24 which is an H-type arm as shown in FIG. 13 and corresponding to the first arm member 122 in FIG. 9 extends from its inner end, in fact two ends, pivotably connected with the vehicle body 34, particularly a bracket portion 52 thereof, by pivot joint 50 each including a shaft portion 46 and an annular rubber bush 48 and corresponding to the pivot joint 124 in FIG. 9 to its outer end, in fact two ends, pivotably connected with a lower end of a link member 58 corresponding to the link member 126 in FIG. 9 by a pivot joint, in fact two joints, 62 each including a shaft member 60 and corresponding to the pivot joint 128 in FIG. 9. An upper end of the link member 58 is pivotably connected with an inner end of an arm member 22 corresponding to the second arm member 130 in FIG. 9 by a pivot joint 56 including a pivot shaft 54 and corresponding to the pivot joint 132 in FIG. 9. An outer end of the arm member 22 is pivotably connected with the vehicle body 34, particularly a bracket portion 44 thereof, by a pivot joint 42 including a pivot shaft 38 and an annular rubber bush 40 and corresponding to the pivot joint 134 in FIG. 9.

A middle portion of the link member 58, in fact a portion which is much closer to its lower end than to its upper end as shown in the figure, is pivotably connected with an upper portion of the knuckle 10 by a pivot joint 64 corresponding to the pivot joint 136 in FIG. 9. The pivot joint 26 between the lower portion of the knuckle 10 and the lower arm 20 and the pivot joint 64 between the upper portion of the knuckle 10 and the middle portion of the link 58 define the king pin axis designated by 72 and corresponding to the king pin axis 120 in FIG. 9.

The vehicle body 34 includes a side member 34a which firmly supports the bracket portion 52. A biasing means constructed as a combination of a shock absorber 68 and a suspension spring 70 is mounted between the vehicle body 34 and an arm portion 66 projecting from a middle portion of the link member 58 so that a parallelogrammic link mechanism constructed by the lower arm 20, the knuckle 10, the vehicle body 34 and the Z-type upper arm assembly composed of the first arm member 24, the link member 48 and the upper arm member 22, is biased in the manner of resiliently supporting the knuckle 10 relative to the vehicle body 34. The biasing means may be constructed by using an air spring. Further, the biasing means may have a construction of the so-called active suspension.

It will be apparent that the embodiments shown in FIGS. 5, 10 and 11 are also available in a more practical construction similar to the construction shown in FIGS. 12 and 13.

Although the invention has been described in detail with respect to some preferred embodiments thereof, it will be apparent for those skilled in the art that various modifications are possible with respect to the shown embodiments within the scope of the present invention.

I claim:

1. A suspension for a steering vehicle wheel in a vehicle constructed to run along a longitudinal axis thereof, comprising a knuckle for supporting the steering vehicle wheel to be rotatable about a central axis thereof, a lower arm means extending substantially transversely to said longitudinal axis in the vehicle from an inboard end thereof pivotably connected with a body of the vehicle to an outboard end thereof pivotably connected with a lower portion of said knuckle, an upper arm assembly pivotably supporting an upper portion of said knuckle relative to the body of the vehicle functionally in parallel with said lower arm means, and a biasing means biasing a combination of said knuckle, said lower arm means and said upper arm assembly downward relative to the body of the vehicle, wherein said upper arm assembly comprises a first arm member extending substantially transversely to said longitudinal axis in the vehicle from an inboard end thereof pivotably connected with the body of the vehicle to an outboard end thereof, a link member extending substantially vertically in the vehicle from a lower end thereof pivotably connected with said outboard end of said first arm member to an upper end thereof, and a second arm member extending substantially transversely to said longitudinal axis in the vehicle from an inboard end thereof pivotably connected with said upper end of said link member to an outboard end thereof pivotably connected with the body of the vehicle, said upper portion of said knuckle being pivotably connected with a middle portion of said link member.

2. A suspension according to claim 1, wherein said first arm member is inclined upward toward outboard of the vehicle relative to said lower arm means, and said second arm member is substantially parallel with said lower arm means.

3. A suspension according to claim 1, wherein said first arm member is substantially parallel with said lower arm means, and said second arm member is inclined upward toward outboard of the vehicle relative to said lower arm means.

4. A suspension according to claim 1, wherein said first arm member is substantially shorter than said lower arm means.

5. A suspension according to claim 1, wherein said second arm member is substantially shorter than said lower arm means.

6. A suspension according to claim 1, wherein both said first arm member and said second arm member are substantially parallel with said lower arm means.

7. A suspension according to claim 1, wherein both said first arm member and said second arm member are inclined upward toward outboard of the vehicle relative to said lower arm means.

* * * * *